United States Patent
Newhart et al.

(10) Patent No.: US 10,207,822 B2
(45) Date of Patent: Feb. 19, 2019

(54) TEST MODULE FIXTURE FOR AERIAL VEHICLE MODULE

(71) Applicants: Troy S. Newhart, King George, VA (US); Joshua D. Taylor, Fredericksburg, VA (US); Jonathan U. Crook, King George, VA (US); John W. Gawalt, King George, VA (US); Jordan C. Lieberman, Fredericksburg, VA (US); Jessica L. Hildebrand, Fredericksburg, VA (US); Charles T. Miller, Fredericksburg, VA (US)

(72) Inventors: Troy S. Newhart, King George, VA (US); Joshua D. Taylor, Fredericksburg, VA (US); Jonathan U. Crook, King George, VA (US); John W. Gawalt, King George, VA (US); Jordan C. Lieberman, Fredericksburg, VA (US); Jessica L. Hildebrand, Fredericksburg, VA (US); Charles T. Miller, Fredericksburg, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 117 days.

(21) Appl. No.: 15/617,195

(22) Filed: Jun. 8, 2017

(65) Prior Publication Data
US 2018/0354655 A1 Dec. 13, 2018

(51) Int. Cl.
*G01M 17/00* (2006.01)
*B64F 5/60* (2017.01)
*B64C 39/02* (2006.01)

(52) U.S. Cl.
CPC ............ *B64F 5/60* (2017.01); *G01M 17/00* (2013.01); *B64C 39/024* (2013.01)

(58) Field of Classification Search
CPC ......... B64F 5/60; G01M 17/00; B64C 39/024
See application file for complete search history.

(56) References Cited

U.S. PATENT DOCUMENTS

| | | | | |
|---|---|---|---|---|
| 5,921,839 | A * | 7/1999 | Siren | B43M 99/003 40/358 |
| 9,354,134 | B2 * | 5/2016 | Commo | G01M 9/062 |
| 2016/0376031 | A1 * | 12/2016 | Michalski | B64F 1/36 701/15 |
| 2017/0328513 | A1 * | 11/2017 | Davis | F16M 11/046 |

* cited by examiner

*Primary Examiner* — Freddie Kirkland, III
(74) *Attorney, Agent, or Firm* — Gerhard W. Thielman, Esq.

(57) ABSTRACT

A fixture is provided for securing an annular drone module to a test stand. The fixture includes a rear outside annulus, a front inside annulus, a plurality of tabs, and a plurality of flanges. The rear outside annulus extend radially to an outer rim and longitudinally from an aft surface and a lip surface. The front inside annulus extends radially to a mezzanine rim and longitudinally from the lip surface to a fore surface. The tabs extending radially from the mezzanine rim on the front inside annulus. The plurality of flanges extending from the outer rim on the rear outside annulus. The drone module is disposed facing the lip surface between the tabs and the mezzanine rim by first mechanical fasteners, and the flanges mount to the test stand by second mechanical fasteners, such as screws. The fixture can be a unitary construction and be composed of thermoset plastic.

5 Claims, 7 Drawing Sheets

TEST MODULE FIXTURE FOR AERIAL VEHICLE MODULE

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to test fixtures for drone components. In particular, the invention relates to a ring adapter that attaches a drone forebody to a test platform.

The ScanEagle aerial drone by Insitu (a subsidiary of Boeing) represents a modular unmanned aerial vehicle (UAV) designed for low-flying reconnaissance and operates world-wide. Such UAV platforms constitute the sortie portion of unmanned aerial systems (UAS). The Scan Eagle is launched by catapult and recovered by snag wires. Introduced in 2005, the ScanEagle has a wingspan of just over ten feet and a top speed of 92 miles-per-hour (mph). FIG. 1 shows a perspective assembly view 100 of a ScanEagle drone 110. A compass rose 120 in Cartesian coordinates shows x, y and z orthogonal axes for respective forward-longitudinal, port-lateral and azimuth directions. FIG. 2 shows a perspective exploded view 200 of ScanEagle components.

These include a nose cone 210 with an imagery dome window turret 215, an electronics payload bay 220 containing avionics 225, a fuselage module 230, port and starboard wings 240 with corresponding vertical stabilizer winglets 250 at their tips, a propulsion module 260 contains the fuel, and a propeller module 270 at the tail. A scale 280 provides a comparative length indicator. The nose cone 210 and electronics bay 220 constitute a forebody payload section. The fuselage and propulsion modules 230 and 260 constitute a midbody. The propeller module 270 denotes a rearbody.

Test platforms for empirical data acquisitions can include a variety of enclosures. Tests can be conducted in environmental chambers to simulate particular temperature and humidity conditions, shaker platforms for subjecting equipment to vibration conditions, anechoic rooms for acoustic and radio frequency wave exposure, and wind tunnels to simulate flight conditions in the atmosphere. FIG. 3 shows a perspective view 300 of a wind-tunnel interior bounded by vertical walls 310 and horizontal boundaries 320 (e.g., floor and ceiling). Wind coordinates 330 constitute tunnel axes for drag 332, crosswind 334 and lift 336.

A longitudinal tunnel arrow denotes airflow direction 340 towards a test model 350 disposed in the wind tunnel. Body coordinates 360 constitute model rotation axes for roll 362, pitch 364 and yaw 366. These axes respectively bodily represent axial, lateral and normal directions. The model 350 can be mounted to a sting arm 370 that attaches to a sting base 380 on the tunnel floor 320. Flight, angles 390 denote angle-of-attack α 392 and yaw ψ 394. A ScanEagle drone 110 or components thereof can be installed on a sting arm 370 for testing in the wind, tunnel or other environmental chamber to gather empirical responses to subject conditions.

SUMMARY

Conventional test arrangements yield disadvantages addressed by various exemplary embodiments of the present invention. In particular, various exemplary embodiments provide an adapter for mounting aerial drone components to a platform for exposure to test conditions. The adaptive fixture secures an annular drone module to a test stand as the platform. The fixture includes a rear outside annulus, a front inside annulus, a plurality of tabs, and a plurality of flanges.

The rear outside annulus extend radially to an outer rim and longitudinally from an aft surface and a lip surface. The front inside annulus extends radially to a mezzanine rim and longitudinally from the lip surface to a fore surface. The tabs extending radially from the mezzanine rim on the front inside annulus. The plurality of flanges extending from the outer rim on the rear outside annulus. The drone module is disposed facing the lip surface between the tabs and the mezzanine rim by first mechanical fasteners, and the flanges mount to the test stand by second mechanical fasteners, such as screws. The fixture can be a unitary construction and be composed of thermoset plastic.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
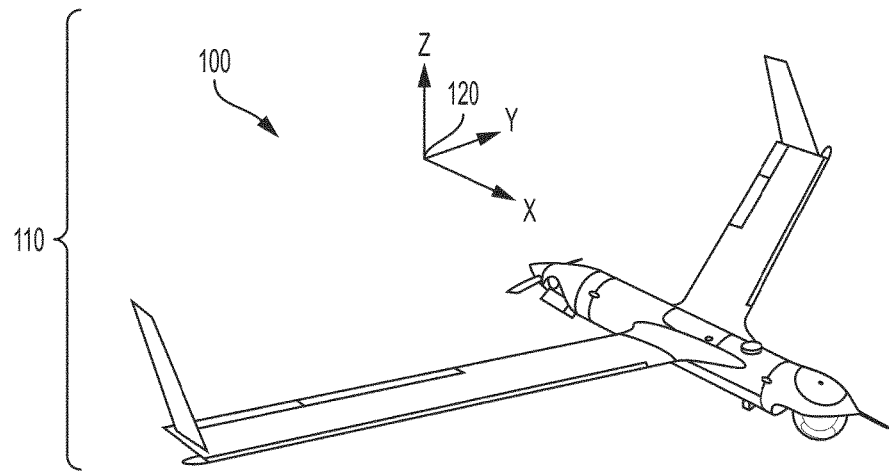
FIG. 1 is a perspective assembly view of a conventional ScanEagle UAV by Boeing Insitu.
Figure 2:
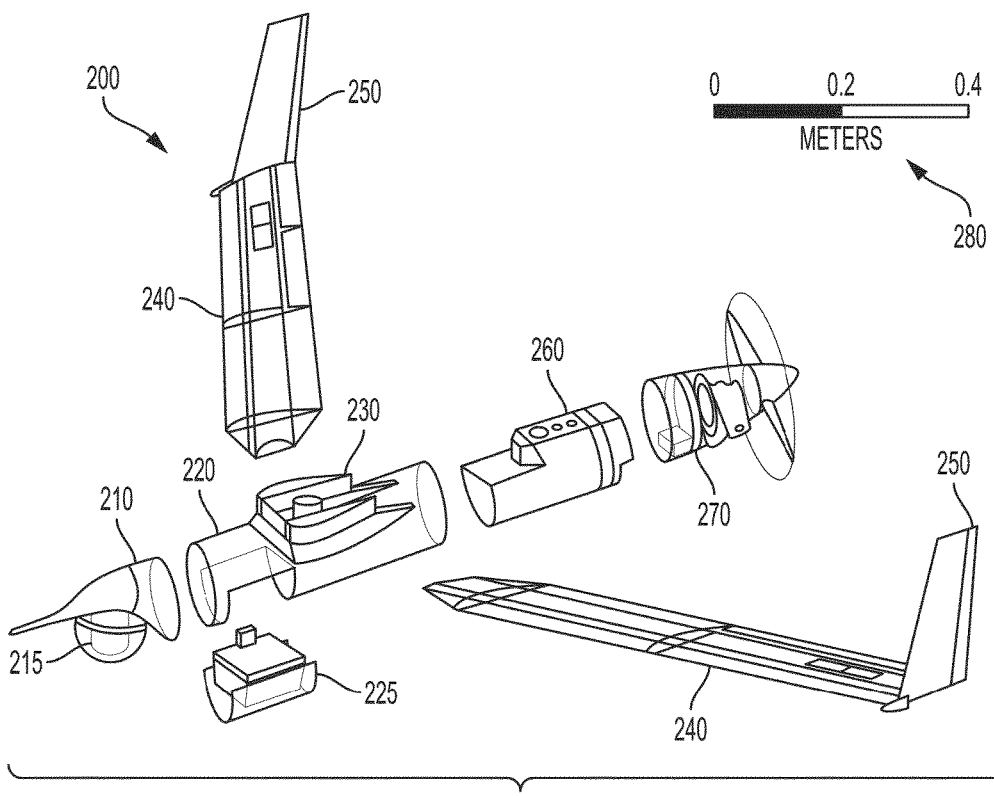
FIG. 2 is a perspective exploded view of the ScanEagle UAV.
Figure 3:
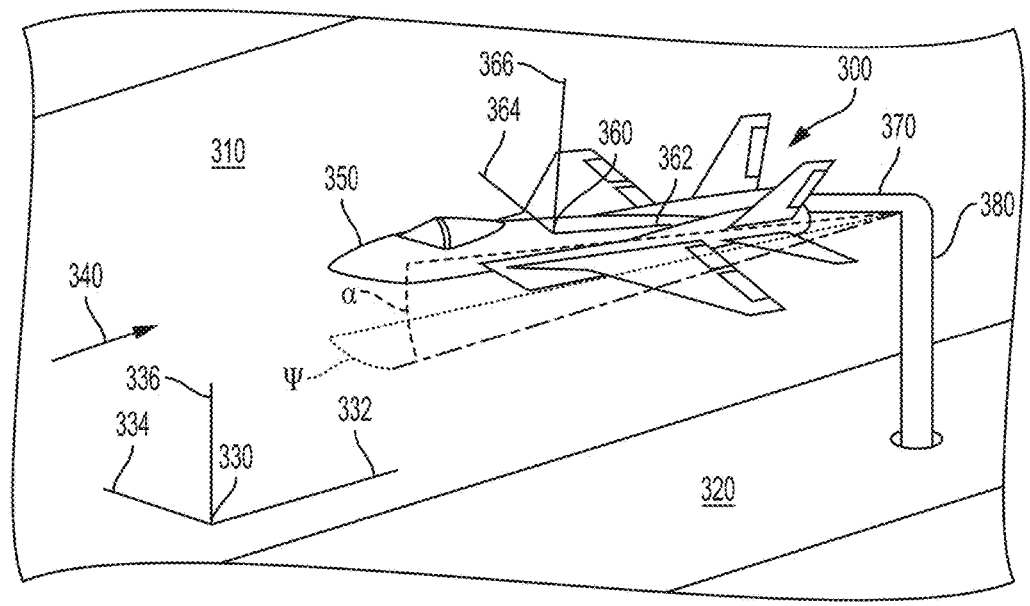
FIG. 3 is a perspective view of a wind tunnel test section.
Figure 4:
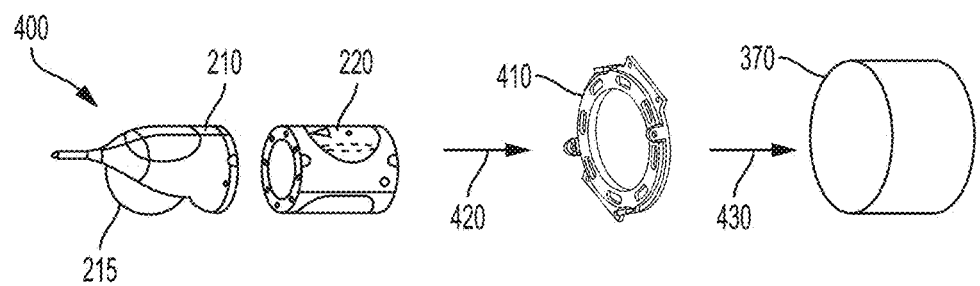
FIG. 4 is a perspective exploded view of a ScanEagle modules in conjunction with exemplary embodiments of a test mount adapter.

FIG. 4 shows a perspective exploded view 400 of ScaExit nEagle components in association with the exemplary test fixture 410 as a ring adapter. In this example, the nose cone 210 and electronics bay 220 connect together as a forebody sub-assembly. The fixture 410 attaches to the sting arm 370 as part of a test stand. The sub-assembly then mounts to the fixture 410. Artisans of ordinary skill will appreciate that other modules of the ScanEagle 110 can be mounted to the fixture 410.

Further, such artisans will recognize that an alternate geometry of a generalized fixture configuration enables components from an alternate UAV to be mounted for test evaluation. The fixture 410 can be produced by fused deposition modeling (FDM) as a three-dimensional (3-D) printing technique. Various stiff light-weight polymer materials are available for such purposes, including acrylonitrile butadiene styrene (ABS), polylactic acid, polycarbonate, polyamide and polystyrene. Alternatively, the fixture 410 can be composed of metal, such as aluminum or steel, which can be more expensive but also more durable than thermoset plastic.

The fixture 410 can be preferably a unitary construction, or separate symmetrical components combined by adhesive and/or fasteners. The fixture could be fabricated from an aluminum or steel plate having a thickness of 1.25 inches mounted in a four-axis computer controlled mill. For ScanEagle components, the fixture 410 would be expected to have the following weights: 0.45 lb for polycarbonate, 0.49 lb for polybutyrate, 1.02 lbs for aluminum 6061T6 and 2.97 lbs for carbon steel.

Figure 5:
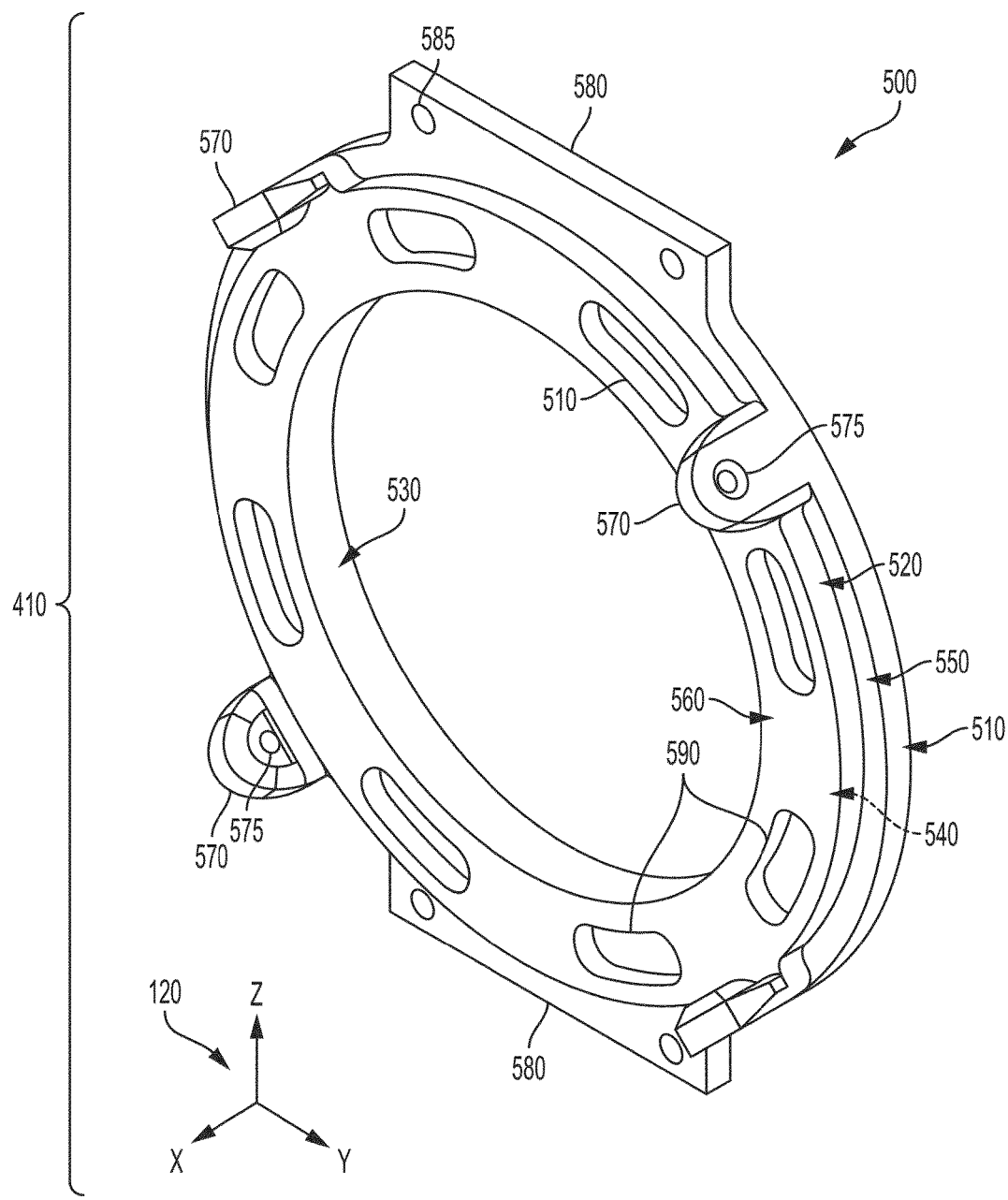
FIG. 5 is an isometric view of the exemplary adapter.

FIG. 5 shows an isometric view 500 of the annular test fixture 410. Radially, the fixture 410 extends to an outer rim 510 at maximum, a mezzanine rim 520 that radially engages the payload bay 220 as ScanEagle's test module, ending at an inner rim 530 at minimum. Longitudinally, the fixture 410 extends from an aft surface 540 (from behind) that faces the sting arm 370, a Up surface 550 between the outer and mezzanine rims to buttress the test module, and a fore surface 560. A plurality of fastener tabs 570 extend forward from the Up surface 550.

For attachment to components for ScanEagle 110, a total of four tabs 570 are disposed in cruciform pattern. Each tab 570 includes a tab through-hole 575 for receiving an 8-32 screw fastener. A bilaterally symmetric pair of edge flanges 580 extend radially from the outer rim 510. Flange through-holes 585 are disposed at the lateral corners of each flange 580 from the lip surface 550 to the aft surface 540. A plurality of arc channels 590 extend in depth from the fore surface 560 to the lip surface 550. The configuration for the fixture 410 shown provides eight such arc channels 590.

The fixture 410 can be a unitary item as shown in view 500, or assembled from geometrically simple components. These can be categorized as a rear outside annulus, a front inside annulus, the four tabs 570 and the flanges 580. The rear outside annulus can be defined radially between the inner rim 530 and the outer rim 510 and longitudinally between the aft surface 540 and the lip surface 550. The front inside annulus can be defined radially beween the inner rim 530 and the mezzanine rim 520 and longitudinally between the lip surface 550 and the fore surface 560. The flanges 580 extend opposite each other radially from the rear outside annulus. The tabs 570 extend radially from the mezzanine rim 520 on the front inner annulus. The rear outside and front inside annuli can be bound together by various mechanisms, including adhesives and/or mechanical fasteners.

Figure 6:
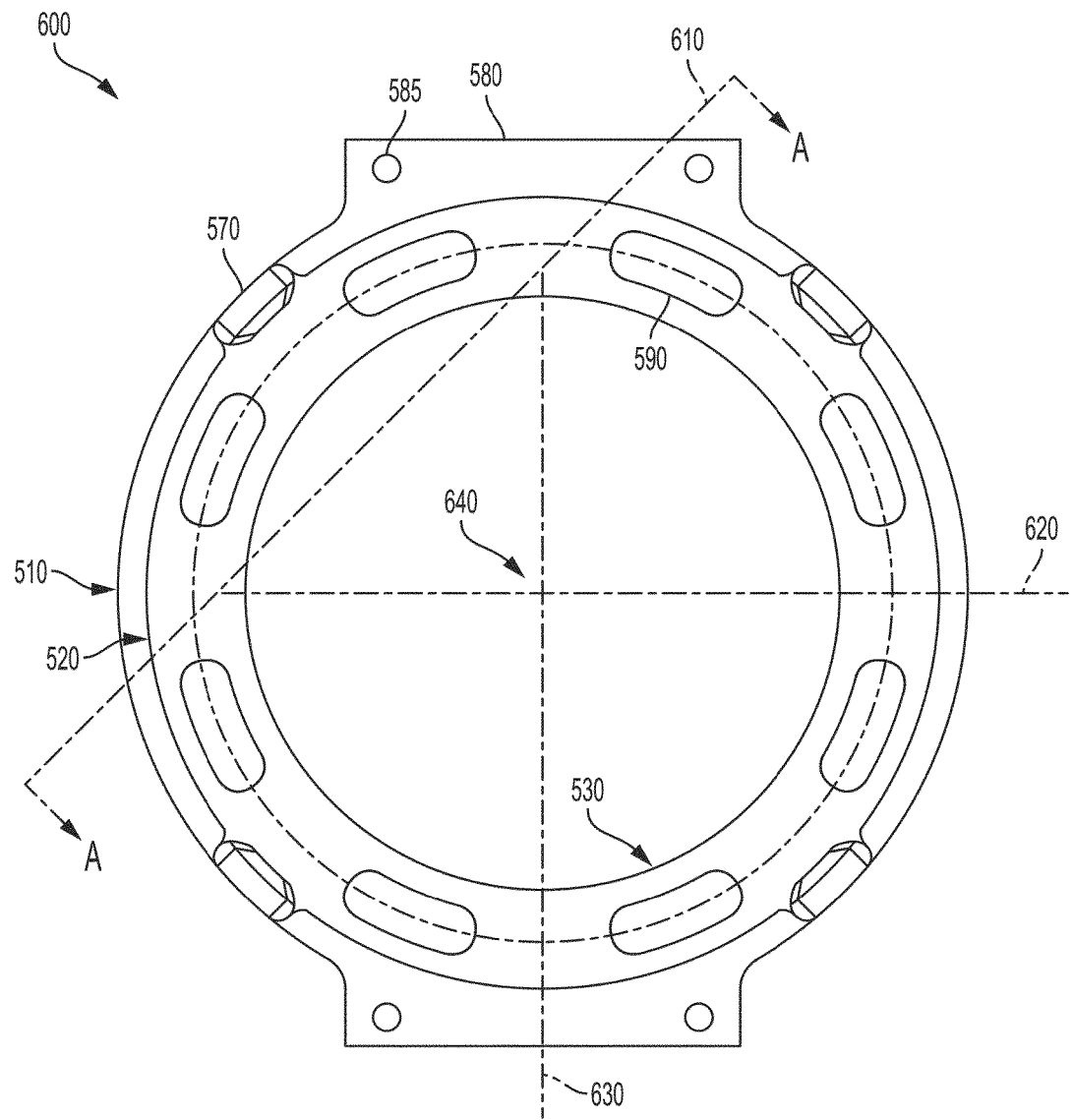
FIG. 6 is a plan view of the exemplary adapter.

FIG. 6 shows a plan view 600 of the text fixture 410 showing faces for the lip surface 560 and the fore surface 560. Cross-planes include section A-A 610, horizontal plane 620, and vertical plane 630. Section A-A 610 is linearly offset from the horizontal plane 620 and angularly turned by 45°. An axial centerline 640 provides a rotational symmetry reference. Exemplary dimensions are identified for mounting modules from the ScanEagle 110. The outer rim 510 has a diameter of 7.5 inches, while the flanges 580 extend to 8.0 inches. The faces for outer rim 510, mezzanine rim 520 and inner rim 530 are shown in profile in view 600.

Figure 7:
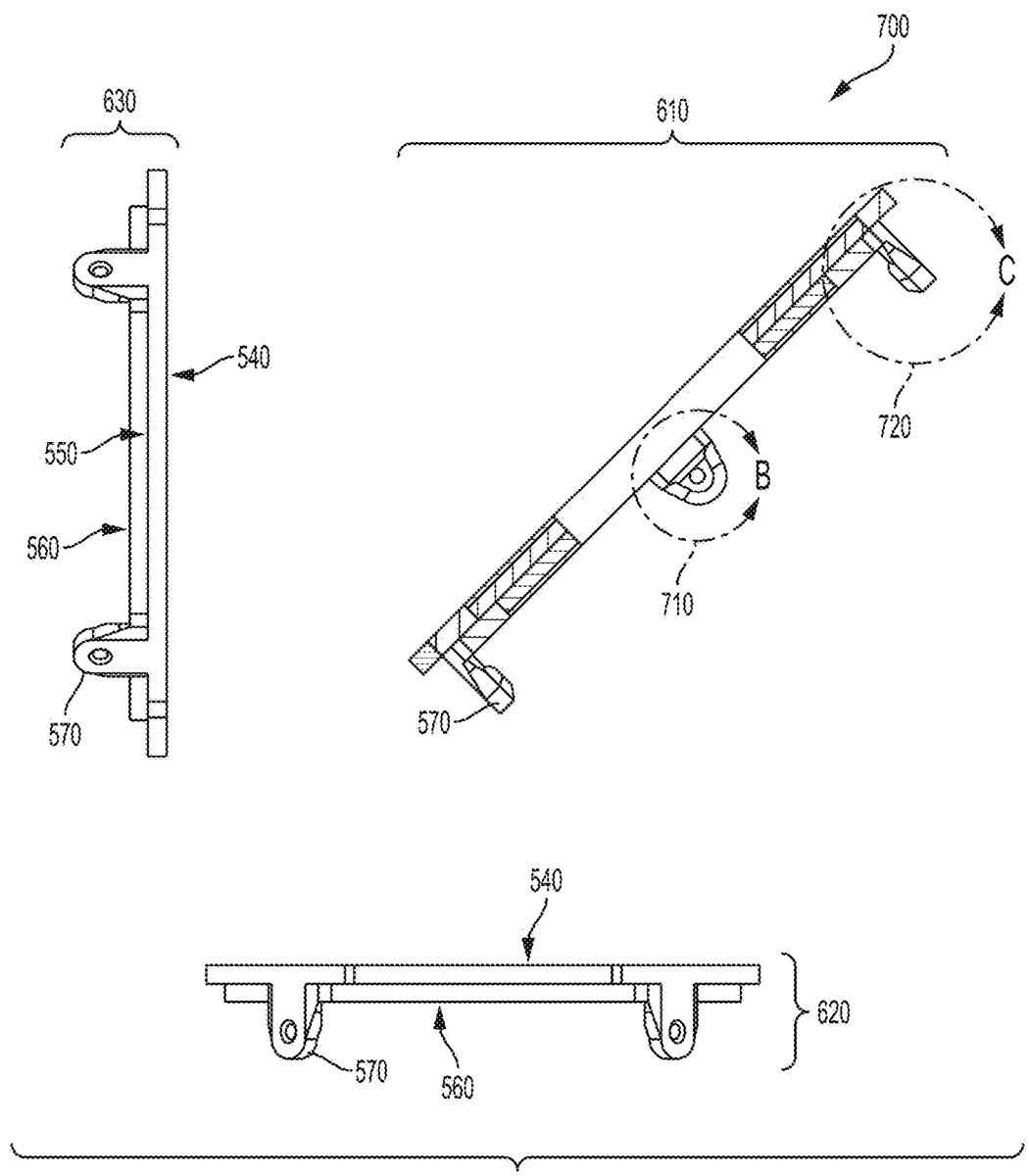
FIG. 7 is a set of elevation views of the exemplary adapter.

FIG. 7 shows elevation views 700 of the text fixture 410 showing the outer rim 510 and mezzanine rim 520, including section A-A 610, horizontal plane 620 and vertical plane 630. Detail regions include sections B-B 710 and C-C 720. The faces for aft surface 540, lip surface 550 and fore surface 560 are shown in profile in view 700. Exemplary dimensions are identified for mounting modules from the ScanEagle 110. For purposes of structural integrity, the thickness of the rim between the aft surface 540 and the lip surface 550 is 0.25 inch, and the thickness of the fixture 410 between the aft surface 540 and the fore surface 560 is 0.5 inch. The radial distance between inward faces of facing tabs 570 is 6.81 inches.

Figure 8:
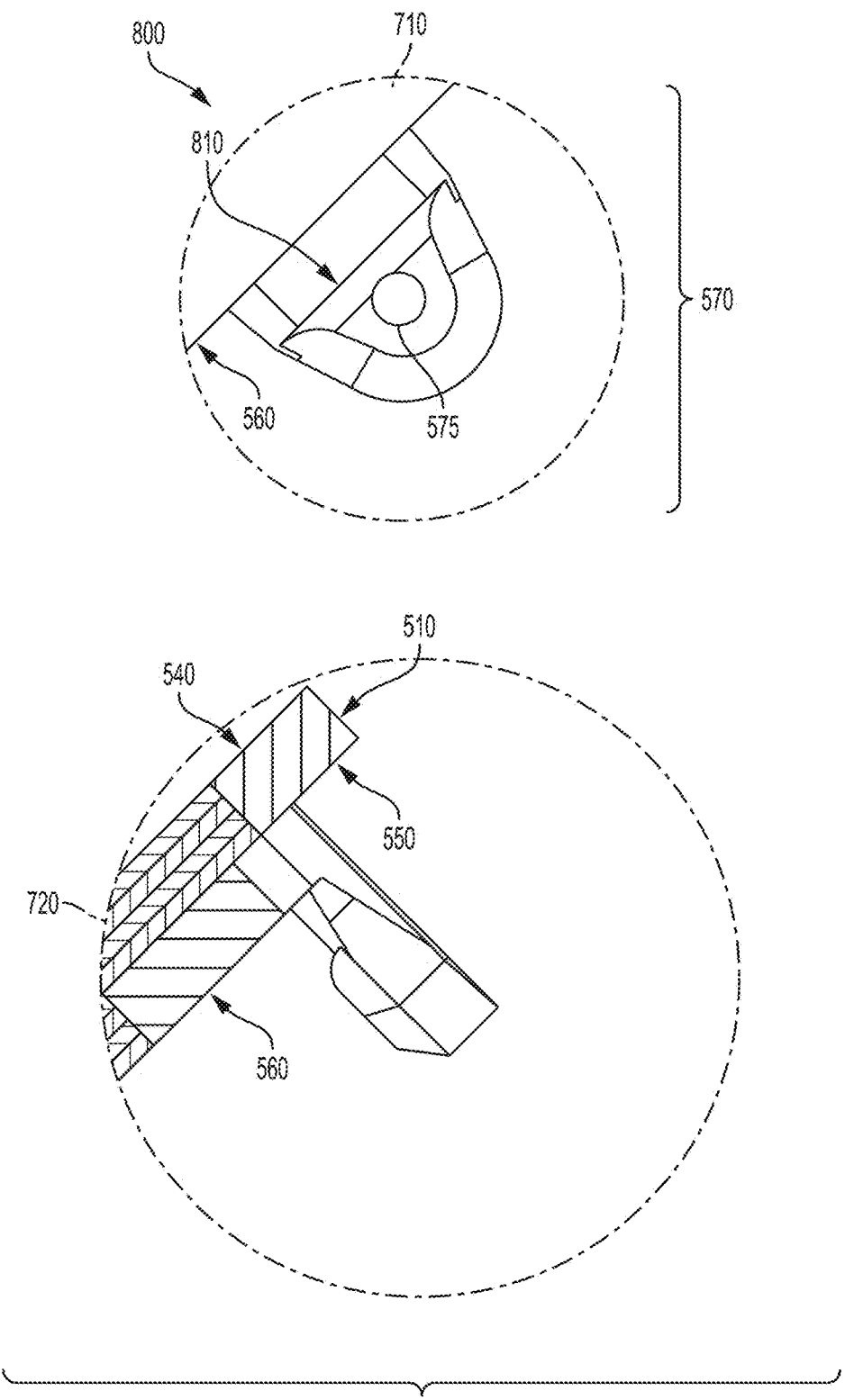
FIG. 8 is a set of detail views of a mount tab on the adapter.
Figure 9:
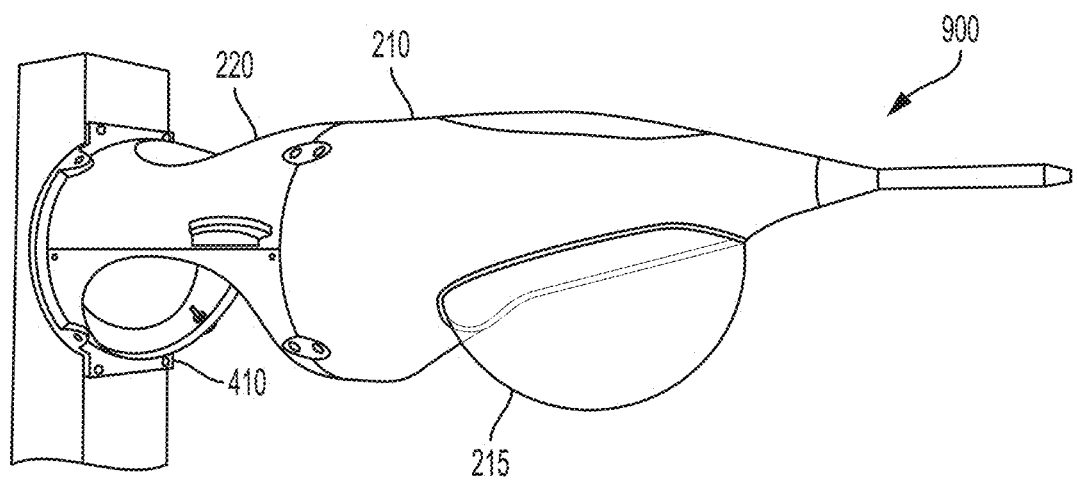
FIG. 9 is a photographic view of the adapter attaching ScanEagle forebody modules.

FIG. 8 shows an elevation detail views 800 of the tabs 570 in sections B-B 710 and C-C 720. An under surface 810 denotes a reference plane that denotes a tab lip. A radial rim of the ScanEagle test module inserts between the under surface 810 and the fore surface 560. As shown for the ScanEagle modules configuration, the distance between the centerline of the through-hole 575 and the fore surface 560 is 0.39 inch. The tab 570 has a maximum thickness of 0.344 inch FIG. 9 shows a perspective assembly view 900 of ScanEagle components mounted to the text fixture 410. In particular, the nose cone 210 with dome turret 215 and payload bay 220 attach together to the fixture 410. A stand aft of the fixture 410 represents a vertical platform that serves as the sting arm 370.

The exemplary fixture or adapter illustrated in the accompanying drawings is utilized during aerodynamic testing of a UAS payload bay 220. The exemplary fixture needs to be sufficiently strong to anchor segments of a UAS to a rigid background without altering its attachment method when combined as a whole unit. The exemplary fixture 410 can be adapted for various drone platform components, not only the ScanEagle 110, whose application herein is provided as an example.

Sly Fox provides workforce development initiatives to engage teams of scientists and engineers in early career to rapidly prototype a solution to satisfy a specific need in the Department of Defense (DoD) with a limited amount of time and a strict budget. Sly Fox Mission 21 was tasked with developing a system compatible with various UAS platforms that supports a suite of chemical, biological, or radiological (CBR) detection and collection capabilities, and is able to relay threat data to a ground control system (GCS). In order to test this system, flights on multiple UAS platforms will be performed at the Naval Surface Warfare Center-Dahlgren Division (NSWCDD). The ScanEagle 110 is one such UAS platform that challenges the Sly Fox Mission 21 capabilities. For this reason, all parameters of the depicted fixture are to ScanEagle specifications. These could easily be modified for other UAS platforms as needed.

Operating a ScanEagle 110 for testing constitutes an expensive endeavor. Developmental testing is required throughout the prototyping process to ensure all systems will operate as designed while in flight. To perform the developmental testing required and remain in budget, the Sly Fox Mission 21 team outlined a test procedure that simulates the flight of a ScanEagle without the price of actually flying. The ScanEagle is sectioned into various bays that are connected via four tabs 570 and held by eight 8-32 screws per attachment of two modules. Four of these eight 8-32 screws radially and angularly secure the fixture 410 to the module via the tab holes 575, and the remaining four 8-32 screws longitudinally secure the fixture 410 to the sting arm 370 via the flange holes 585. Because not all sections of the ScanEagle are required to simulate airflow to the Sly Fox mission 21 air scoop in the propeller module 270, this test configuration reduces the cost of sub-system testing.

The exemplary fixture 410 is a structure designed to simulate the connection of a UAS section of at least one module to the entire UAV while also mounting the section to any rigid background. The design illustrated depicts the fixture 410 designed specifically for use with any module of the ScanEagle 110. The four connection tabs 570 are designed to fit the indents of each ScanEagle section. This fit ensures absence of any gap is between the fixture 410 and the tab 570 such as is when conventionally attached. At the bottom of the protrusion, located on the interior face of the tabs 570, slight modification from the exact shape of the bay indents enables smoother attachment and removal of the fixture 410 to the section.

The through-holes 575 are concentric with the section and fixture tab 570. The thru holes have been sized such that no excess space occurs around the 8-32 screws, which are easily threaded into the section. Fillets were placed around each tab to increase the surface area thus decreasing stress concentration experienced by each tab 570. The thickness of the fixture 410 was measured such that small protrusions off of the rear portion of the section, i.e., hose connectors, small instrumentation devices, wires, etc., would not deter the fixture 410 from lying flush with a solid background.

The circular surface located interior to the tabs are designed to sit flush with the rear portion of any ScanEagle section. The flat segments with a total of four holes that protrude off of the top and bottom portion of the fixture attach the system to any solid background. The detailed SolidWorks illustration in view 600 illustrates exemplary dimensions of the test fixture.

The exemplary fixture 410 operates as an interface between a UAS section and a solid background. This fixture 410 eliminates the need to perform payload or sectional testing on an entire UAS platform. Incorporation of the exemplary fixture 410 also expands on the variety of testing that can be performed on sections and payloads with the possibility of simulating flights. Reducing the number of UAV flights and using complete UAS platforms drastically decreases the developmental testing cost of payloads and components of UAS platforms.

The fixture 410 (as dimensionally configured for the appropriate UAS platform) could be commercially utilized by any test and evaluation (T&E) agency or fixed wing UAS operators who would like to perform developmental testing on payloads and components without flying the UAS. Manufacturing of the fixture could be completed using multiple methods. The fabrication technique utilized for the prototype example listed for prototype purposes was three-dimensional (3-D) printing. An alternate technique involves machining the fixture 410, which would be more costly, but produce a fixture 410 that lasts much longer and is stronger than its 3-D printed counterpart.

The fixture 410 provides a solution to enable cheaper testing of UAS payload assets. The fixture 410 would ideally be purchased by test-and-evaluation (T&E) agencies that intend to perform developmental testing of payloads without the need for an entire UAS platform and thereby decrease the number of flights required. This would enable groups to perform more payload and developmental testing, ensuring that future payloads operate with fewer defects while in flight aboard its UAS platform.

The fixture 410 enables researchers to perform testing using only the forward payload or electronics bay 220 and nose cone 210 of the ScanEagle 110. This is advantageous in two respects. Because the diameter of the combined payload section of electronics bay 220 and nose cone 210 is seven inches at its widest, the exemplary fixture 410 enables the sections of interest to be tested on much smaller test fixtures, e.g. a wind tunnel of smaller diameter, smaller vibration table, etc., which ultimately decreases the cost of testing and increases the scope of test sites.

The disclosure grants teams the ability to closely simulate flight in a testing environment while minimizing the logistical footprint that such testing entails. Without this fixture 410, testing would have to be conducted using the full ScanEagle platform in flight or in a wind tunnel. While this may be feasible for large budget projects, this becomes prohibitively expensive for small scale research and development (R&D). Due to budget constraints, for the Sly Fox project, there is no identified alternative.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A fixture for securing an annular drone module to a test stand, said fixture comprising:
    a rear outside annulus extending radially to an outer rim and longitudinally from an aft surface and a lip surface;
    a front inside annulus extending radially to a mezzanine rim and longitudinally from said lip surface to a fore surface;
    a plurality of tabs extending radially from said mezzanine rim on said front inside annulus; and
    a plurality of flanges extending from said outer rim on said rear outside annulus, wherein
    the drone module is disposed facing said lip surface between said tabs and said mezzanine rim by first mechanical fasteners, and
    said flanges mount to the test stand by second mechanical fasteners.

2. The fixture according to claim 1, being composed of a polymer.

3. The fixture according to claim 1, being composed as a unitary construction.

4. The fixture according to claim 3, being fabricated by fusion deposition modeling.

5. The fixture according to claim 1, wherein said first and second mechanical fasteners are 8-32 screws.

* * * * *